United States Patent
Brown

(10) Patent No.: US 6,332,431 B1
(45) Date of Patent: Dec. 25, 2001

(54) PERCH FOR TRIMMING OF A BIRD'S NAILS TO A PREDETERMINED LENGTH SO AS TO PREVENT OVER TRIMMING AND RESULTING BLEEDING

(76) Inventor: Barry F. Brown, 1998 Rte. 112, Apt. 11B, Coram, NY (US) 11727

(*) Notice: Subject to any disclaimer, the term of this patent is extended or adjusted under 35 U.S.C. 154(b) by 0 days.

(21) Appl. No.: 09/498,967
(22) Filed: Feb. 7, 2000
(51) Int. Cl.$^7$ ........................... A01K 13/00; A01K 31/12
(52) U.S. Cl. ........................................ 119/600; 119/468
(58) Field of Search ................................ 119/600, 620, 119/468, 174

(56) References Cited

U.S. PATENT DOCUMENTS

| | | | |
|---|---|---|---|
| 1,331,908 | * 2/1920 | Frey | 119/468 |
| 1,425,524 | * 8/1922 | Harrison | 119/468 |
| 2,013,058 | * 9/1935 | Leindorf | 119/468 |
| 2,045,395 | * 6/1936 | Leindorf | 119/468 |
| 2,076,734 | * 4/1937 | Leindorf | 119/468 |
| 2,241,259 | * 5/1941 | Hanson | 119/468 |
| 2,570,663 | * 10/1951 | Guarino | 119/468 |
| 5,235,934 | 8/1993 | Runion | 119/51.01 |
| 5,564,365 | 10/1996 | Kacic | 119/165 |
| 5,588,397 | 12/1996 | Johnakin, III | 119/468 |
| 5,730,084 | 3/1998 | Kacic | 119/165 |

* cited by examiner

Primary Examiner—Charles T. Jordan
Assistant Examiner—Elizabeth Shaw
(74) Attorney, Agent, or Firm—Richard L Miller

(57) ABSTRACT

A perch for trimming the nails of a bird to a predetermined length so as to prevent over trimming and bleeding resulting therefrom. The perch includes a core that perches the bird, a sheet of sandpaper that is rolled around the core and trims the nails of the bird, and a sleeve that is movably disposed on the sheet of sandpaper and assures that the nails of the bird are trimmed only to the predetermined length so as to prevent the over trimming and the bleeding resulting therefrom. The sleeve is entirely covered with a plurality of throughbores that communicate with the sheet of sandpaper and receive the nails of the bird therethrough when the bird is perched uninhibitedly thereon. The nails of the bird are rubbed against the sheet of sandpaper, by virtue of the sleeve being held fixed in one hand and the core being held in the other hand and rotated and moved axially relative to the sleeve, and trimmed to the predetermined length, by virtue of the diameter of the plurality of the throughbores of the sleeve preventing the predetermined length of the nails of the bird from engaging the sheet of sandpaper. The perch shall vary in its comprising diameters so as to properly accommodate variation in any given anatomical nail structures and accordingly allow different predetermined amounts of the nails of the bird to be trimmed.

15 Claims, 1 Drawing Sheet

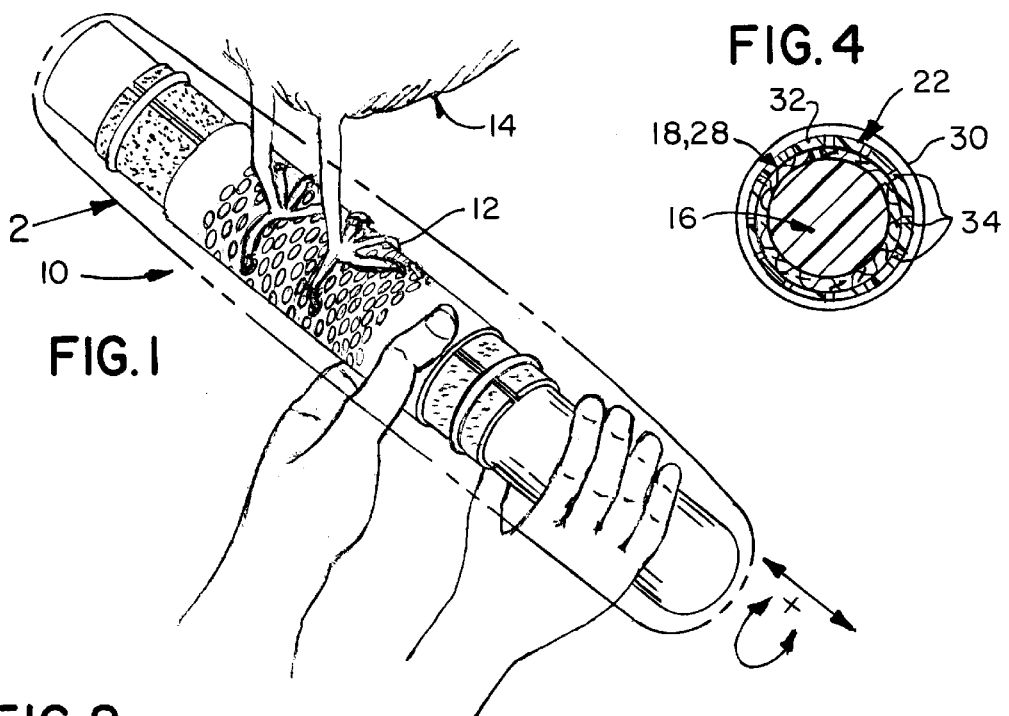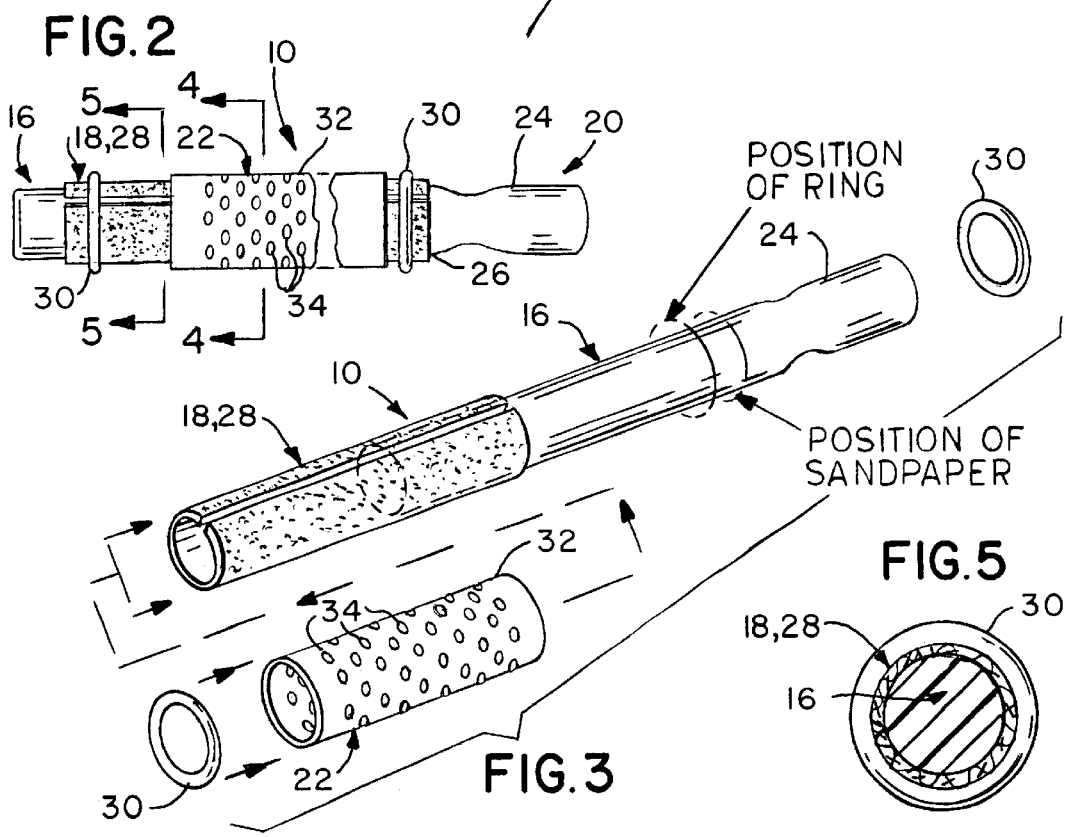

PERCH FOR TRIMMING OF A BIRD'S NAILS TO A PREDETERMINED LENGTH SO AS TO PREVENT OVER TRIMMING AND RESULTING BLEEDING

BACKGROUND OF THE INVENTION

1. Field of the Invention

The present invention relates to a perch. More particularly, the present invention relates to a perch for trimming the nails of a bird to a predetermined length so as to prevent over trimming and bleeding resulting therefrom.

2. Description of the Prior Art

Numerous innovations for pet nail trimmers have been provided in the prior art that will be described. Even though these innovations may be suitable for the specific individual purposes to which they address, however, they differ from the present invention.

A FIRST EXAMPLE, U.S. Pat. No. 5,235,934 to Runion teaches an abrasive surface that is provided on the feeding surface of a bird feeder pan. Thus as the birds eat, their beaks are abraded and trimmed. This controls the growth simultaneously with feeding the birds. The abrasive surface includes abrasive particles bonded to the feeding surface directly or may be bonded to the carrier which is adhered to the feeding surface.

A SECOND EXAMPLE, U.S. Pat. No. 5,564,365 to Kacic teaches a litter box for domestic cats or other domestic mammals that has interior surfaces which are abrasive and that dull the claws of a cat when it uses the litter box. Abrasive material may be incorporated into the surfaces of the box, can be sprayed or rolled on the surfaces or can take the form of a thin flexible sheet of abrasive sheet material which is adhered to the surfaces of the box. Sheets are constructed to fit the side surfaces, end surfaces and bottom surface. The sheets can be adhered with a permanent or with an easily removable adhesive. The easily removable sheets can be replaced when worn. The sheets may include waterproofing material and or scented material and may be imprinted with a design pattern.

A THIRD EXAMPLE, U.S. Pat. No. 5,588,397 to Johnakin, III teaches an elongated perch rod with a disk attached to one end. The perch rod functions as a perch and nail trimming device and the disk functions as a beak trimming and conditioning device. The disk (beak conditioner) is of shorter length and larger diameter than the perch rod. A connection assembly, which acceptably includes a threaded rod, nut, and washer is attached to the face of the disk (beak conditioner) that is opposite from the face of the disk from which the perch rod extends. The connection assembly functions such that the entire bird perch apparatus can be easily mounted to a bird cage or similar structure. The perch rod and disk are preferably made of a solid, abrasive material, such as concrete or resin with a gritty material embedded therein, so that the abrasive properties of the material preferably stay constant.

A FOURTH EXAMPLE, U.S. Pat. No. 5,730,084 to Kacic teaches a litter box for domestic cats or other domestic mammals that has interior surfaces which are abrasive and that dull the claws of a cat when it uses the litter box. Abrasive material may be incorporated into the surfaces of the box, can be sprayed or rolled on the surfaces or can take the form of a thin flexible sheet of abrasive sheet material which is adhered to the surfaces of the box. Sheets are constructed to fit the side surfaces, end surfaces and bottom surface. The sheets can be adhered with a permanent or with an easily removable adhesive. The easily removable sheets can be replaced when worn. The sheets may include waterproofing material and/or scented material and may be imprinted with a design pattern.

It is apparent that numerous innovations for pet nail trimmers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a perch for trimming the nails of a bird to a predetermined length so as to prevent over trimming and bleeding resulting therefrom that avoids the disadvantages of the prior art.

ANOTHER OBJECT of the present invention is to provide a perch for trimming the nails of a bird to a predetermined length so as to prevent over trimming and bleeding resulting therefrom that is simple and inexpensive to manufacture.

STILL ANOTHER OBJECT of the present invention is to provide a perch for trimming the nails of a bird to a predetermined length so as to prevent over trimming and bleeding resulting therefrom that is simple to use.

BRIEFLY STATED, YET ANOTHER OBJECT of the present invention is to provide a perch for trimming the nails of a bird to a predetermined length so as to prevent over trimming and bleeding resulting therefrom. The perch includes a core that perches the bird, a sheet of sandpaper that is rolled around the core and trims the nails of the bird, and a sleeve that is movably disposed on the sheet of sandpaper and assures that the nails of the bird are trimmed only to the predetermined length so as to prevent the over trimming and the bleeding resulting therefrom. The sleeve is entirely covered with a plurality of throughbores that communicate with the sheet of sandpaper and receive the nails of the bird therethrough when the bird is perched uninhibitedly thereon. The nails of the bird are rubbed against the sheet of sandpaper, by virtue of the sleeve being held fixed in one hand and the core being held in the other hand and rotated and moved axially relative to the sleeve, and trimmed to the predetermined length, by virtue of the diameter of the plurality of the throughbores of the sleeve preventing the predetermined length of the nails of the bird from engaging the sheet of sandpaper. The perch shall vary in its comprising diameters so as to properly accommodate variation in any given anatomical nail structures and accordingly allow different predetermined amounts of the nails of the bird to be trimmed.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention in uses;

FIG. 2 is a reduced diagrammatic side elevational view of the area generally enclosed by the dotted curve identified by arrow 2 in FIG. 1 of the present invention;

FIG. 3 is an exploded diagrammatic perspective view of the present invention shown in FIG. 3;

FIG. 4 is an enlarged diagrammatic cross sectional view taken on line 4—4 in FIG. 2; and FIG. 5 is an enlarged diagrammatic cross sectional view taken on line 5—5 in FIG. 2.

LIST OF REFERENCE NUMERALS UTILIZED IN THE DRAWING 10 perch of present invention for trimming nails 12 of bird 14 to predetermined length so as to prevent over trimming and bleeding resulting therefrom
12 nails of bird 14
14 bird
16 core for perching bird 14
18 abrasive for trimming nails 12 of bird 14
20 apparatus
22 sleeve for making sure that nails 12 of bird 14 are trimmed only to predetermined length so as to prevent over trimming and bleeding resulting therefrom
24 handle on one end 26 of core 16
26 one end of core 16
28 sheet of sandpaper of abrasive 18
30 rings of apparatus 20
32 longitudinal wall of sleeve 22
34 plurality of throughbores along entire length of longitudinal wall 32 of sleeve 22

DETAILED DESCRIPTION OF THE PREFERRED EMBODIMENT

Referring now to the figures, in which like numerals indicate like parts, and particularly to FIG. 1, the perch of the present invention is shown generally at 10 for trimming the nails 12 of a bird 14 to a predetermined length so as to prevent over trimming and bleeding resulting therefrom.

The configuration of the perch 10 can best be seen in FIGS. 2–5, and as such, will be discussed with reference thereto.

The perch 10 includes a core 16 for perching the bird 14, and an abrasive 18 that is associated with the core 16 for trimming the nails 12 of the bird 14.

The perch 10 further includes apparatus 20 that maintains the abrasive 18 associated with the core 16.

The perch 10 further includes a sleeve 22 that is disposed on the abrasive 18 for making sure that the nails 12 of the bird 14 are trimmed only to the predetermined length so as to prevent the over trimming and the bleeding resulting therefrom.

The core 16 is slender, elongated, cylindrically-shaped, and made of plastic, preferably, poly-vinyl-chloride.

The core 16 has a handle 24 that extends axially from one end 26 thereof.

The abrasive 18 is a sheet of sandpaper 28, preferably 80 grit, that is removably rolled concentrically around, and is maintained rigid by, the core 16.

The apparatus 20 includes a pair of rings 30 that are disposed around, and removably maintain, the sheet of sandpaper 28 on the core 16.

The pair of rings 30 are disposed outboard of, so as to not interfere with, and prevent unintentional removal of, the sleeve 22.

The sleeve 22 is a hollow and open-ended cylinder that is indisposed concentrically on the sheet of sandpaper 28 and moves both rotatably and axially on the sheet of sandpaper 28.

The sleeve 22 has a longitudinal wall 32 with a thickness and a length and is entirely covered with a plurality of throughbores 34 along the length thereof that communicate with the sheet of sandpaper 28 for receiving the nails 12 of the bird 114 therethrough when the bird 14 is perched uninhibitedly thereon that are rubbed against the sheet of sandpaper 28, by virtue of the sleeve 22 being held fixed in one hand and the core 16 being held in the other hand and rotated and moved axially relative to the sleeve 22, and trimmed to the predetermined length, by virtue of the diameter of the plurality of the throughbores 34 of the sleeve 22 preventing the predetermined length of the nails 12 of the bird 14 from engaging the sheet of sandpaper 28.

The perch 10 shall vary in its comprising diameters so as to properly accommodate variation in any given anatomical nail structures and accordingly allow different predetermined amounts of the nails of the bird 14 to be trimmed.

It will be understood that each of the elements described above, or two or more together, may also find a useful application in other types of constructions differing from the types described above.

While the invention has been illustrated and described as embodied in a perch for trimming the nails of a bird to a predetermined length so as to prevent over trimming and bleeding resulting therefrom, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A perch for trimming the nails of a bird to a predetermined length so as to prevent over trimming and bleeding resulting therefrom, comprising:
   a) a core for perching the bird; and
   b) an abrasive associated with said core for trimming the nails of the bird; further comprising a sleeve disposed on said abrasive for making sure that the nails of the bird are trimmed only to the predetermined length so as to prevent the over trimming and the bleeding resulting therefrom.

2. The perch as defined in claim 1, further comprising apparatus maintaining said abrasive associated with said core.

3. The perch as defined in claim 1, wherein said core is slender, elongated, and cylindrically-shaped.

4. The perch as defined in claim 1, wherein said core is made of plastic.

5. The perch as defined in claim 1, wherein said core is made of poly-vinyl-chloride.

6. The perch as defined in claim 1, wherein said core has a handle that extends axially from one end thereof.

7. The perch as defined in claim 1, wherein said abrasive is a sheet of sandpaper that is removably rolled concentrically around, and maintained rigid by, said core.

8. The perch as defined in claim 7, wherein said sheet of sandpaper is 80 grit.

9. The perch as defined in claim 7, wherein said apparatus includes a pair of rings that are disposed around, and removably maintain, said sheet of sandpaper on said core.

10. The perch as defined in claim 9, wherein said pair of rings are disposed outboard of, so as to not interfere with, and prevent unintentional removal of, said sleeve.

11. The perch as defined in claim 7, wherein said sleeve is movably disposed concentrically on said sheet of sandpaper.

12. The perch as defined in claim 7, wherein said sleeve moves both rotatably and axially on said sheet of sandpaper.

13. The perch as defined in claim 7, wherein said sleeve has a longitudinal wall with a thickness and a length and is entirely covered with a plurality of throughbores along said length thereof that communicate with said sheet of sandpaper for receiving the nails of the bird therethrough when the bird is perched uninhibitedly thereon that are rubbed against said sheet of sandpaper, by virtue of said sleeve being held fixed in one hand and said core being held in the other hand and rotated and moved axially relative to said sleeve, and trimmed to the predetermined length, by virtue of the diameter of the plurality of the throughbores of said sleeve preventing the predetermined length of the nails of the bird from engaging said sheet of sandpaper.

14. The perch as defined in claim 1, wherein said sleeve is a hollow and open-ended cylinder.

15. The perch as defined in claim 1, wherein said perch shall vary in its comprising diameters so as to properly accommodate variation in any given anatomical nail structures and accordingly allow different predetermined amounts of the nails of the bird to be trimmed.

* * * * *